US007062547B2

(12) United States Patent
Brown et al.

(10) Patent No.: US 7,062,547 B2
(45) Date of Patent: Jun. 13, 2006

(54) METHOD AND SYSTEM FOR PROVIDING A CENTRAL REPOSITORY FOR CLIENT-SPECIFIC ACCESSIBILITY

(75) Inventors: Frances C Brown, Austin, TX (US); Susan Crayne, Hartsdale, NY (US); Samuel R. Detweiler, Austin, TX (US); Peter Gustav Fairweather, Yorktown Heights, NY (US); Vicki Lynne Hanson, Chappaqua, NY (US); Richard Scott Schwerdtfeger, Round Rock, TX (US); Beth Rush Tibbitts, Lexington, KY (US); Sharon Mary Trewin, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 09/961,919

(22) Filed: Sep. 24, 2001

(65) Prior Publication Data

US 2003/0061317 A1    Mar. 27, 2003

(51) Int. Cl.
*G06F 15/177* (2006.01)
*G06F 15/16* (2006.01)
*G06F 17/00* (2006.01)

(52) U.S. Cl. .................... 709/221; 709/246; 715/865
(58) Field of Classification Search ................ 709/246; 717/173; 715/865
See application file for complete search history.

(56) References Cited

U.S. PATENT DOCUMENTS

| 5,727,159 A | 3/1998 | Kikinis | |
|---|---|---|---|
| 5,754,737 A * | 5/1998 | Gipson | 706/11 |
| 5,809,112 A * | 9/1998 | Ryan | 379/52 |
| 5,826,014 A | 10/1998 | Coley et al. | |
| 5,918,013 A | 6/1999 | Mighdoll et al. | |
| 5,940,598 A | 8/1999 | Strauss et al. | |
| 5,983,273 A | 11/1999 | White et al. | |
| 5,996,022 A | 11/1999 | Krueger et al. | |
| 6,008,737 A * | 12/1999 | Deluca et al. | 340/5.74 |

(Continued)

FOREIGN PATENT DOCUMENTS

GB    2 346 238 A    2/2000

(Continued)

OTHER PUBLICATIONS

"A Process for Selective Routing of Servlet Content to Transcoding Modules", Research Disclosure, (Jun. 1999/889), IBM Corporation, pp. 889-890.

(Continued)

*Primary Examiner*—John A. Follansbee
*Assistant Examiner*—Joshua Joo
(74) *Attorney, Agent, or Firm*—Robert M. Carwell; Diana L. Gerhardt; Dillon & Yudell LLP

(57) ABSTRACT

A method and system that provide a central repository for client specific accessibility applications to a user from an accessible server. The repository is updated on a periodic basis with new solutions provided by the service provider, who also manages licensing agreements between the user and the owner of the accessibility application. Accessibility programs, such as page magnification, screen readers, background changes, input modification, etc., are downloaded into the client device being used by the user customer by clicking link buttons from a web page generated by the service provider's server. The accessibility programs downloaded are then resident on the client device until changed by the user. In a preferred embodiment, the service provider also provides a universal transcoding service to apply the user selected accessibility transformations to any type of client device used by the user.

15 Claims, 3 Drawing Sheets

U.S. PATENT DOCUMENTS

| | | | |
|---|---|---|---|
| 6,009,103 A | 12/1999 | Woundy | |
| 6,038,595 A | 3/2000 | Ortony | |
| 6,055,275 A | 4/2000 | Pinier et al. | |
| 6,073,168 A | 6/2000 | Mighdoll et al. | |
| 6,138,150 A | 10/2000 | Nichols et al. | |
| 6,199,144 B1 | 3/2001 | Arora et al. | |
| 6,233,577 B1 | 5/2001 | Ramasubramani et al. | |
| 6,307,549 B1 * | 10/2001 | King et al. | 715/810 |
| 6,324,648 B1 | 11/2001 | Grantges, Jr. | |
| 6,356,543 B1 * | 3/2002 | Hall et al. | 370/352 |
| 6,421,733 B1 * | 7/2002 | Tso et al. | 709/246 |
| 6,496,931 B1 | 12/2002 | Rajchel et al. | |
| 6,510,464 B1 | 1/2003 | Grantges et al. | |
| 6,665,642 B1 * | 12/2003 | Kanevsky et al. | 704/260 |
| 6,697,781 B1 * | 2/2004 | Sahlberg | 704/260 |
| 6,820,055 B1 * | 11/2004 | Saindon et al. | 704/235 |
| 2001/0029496 A1 | 10/2001 | Otto et al. | |
| 2002/0003547 A1 * | 1/2002 | Wang et al. | 345/727 |
| 2002/0155419 A1 * | 10/2002 | Banerjee et al. | 434/322 |
| 2002/0161904 A1 | 10/2002 | Tredoux et al. | |
| 2003/0061387 A1 | 3/2003 | Brown et al. | |

FOREIGN PATENT DOCUMENTS

| | | | |
|---|---|---|---|
| JP | 08241155 | * | 9/1996 |
| WO | WO 99/64967 | | 12/1999 |
| WO | WO 00/03525 | | 1/2000 |
| WO | WO 00/49530 | | 8/2000 |

OTHER PUBLICATIONS

Network Working Group, RFC 2616.

* cited by examiner

METHOD AND SYSTEM FOR PROVIDING A CENTRAL REPOSITORY FOR CLIENT-SPECIFIC ACCESSIBILITY

CROSS-REFERENCE TO A RELATED APPLICATION

The present application is related to the following application, which is filed on even date herewith and incorporated herein by reference: U.S. patent application Ser. No. 09/962,000, now U.S. Pat. No. 6,970,918.

BACKGROUND OF THE INVENTION

1. Technical Field

The present invention relates in general to the field of computer networks, and, in particular, to the connection between a user device and a content server. Still more particularly, the present invention relates to an improved method and system for providing a repository of accessibility applications to a disabled client user.

2. Description of the Related Art

The Internet comprises a vast network of heterogenous computers and sub-networks all communicating together to allow for global exchange of information. The World Wide Web (WWW) is one of the most popular information services on the Internet. The WWW uses browser software to decipher HyperText links to other documents or files located on remote computers, all of which are connected to the Internet. Browsers provide a user-friendly interface that allows users to easily navigate from site to site or file to file around the Internet. Using a browser, a user can access information in the form of text, audio, video, still pictures and related multimedia stored on remote computers or content servers.

FIG. 1 is a block diagram of the Internet and other devices that may be used to access the Internet. A client device 10, such as a desktop computer, laptop computer, personal digital assistant (PDA), onboard vehicle computer, cellular telephone, etc., sends a request for a Web site, typically under the HyperText Transfer Protocol (HTTP) to an Internet Service Provider (ISP) 12. ISP 12 establishes a link to an Internet 14, which then passes the HTTP request to a content server 16. This request is forwarded to a content provider 18 that is typically a web page addressed by a Uniform Resource Indicator (URI) such as a Uniform Resource Locator (URL).

The response from client device 16 is typically in the language of HyperText Markup Language (HTML), which is the standard language for creating documents on the World Wide Web (WWW). HTML defines the structure and layout of a web document by using a variety of tag commands inserted in the document to specify how the document, or portion of the document, should be formatted. The response from content provider 18, is routed back through content server 16, Internet 14, and ISP 12 to client device 10.

A major problem for the Internet relates to providing access to web pages to handicapped users, including the visually impaired, hearing impaired and physically handicapped. Such accessibility for the visually impaired may consist of transforming the style of information received from a web page, such as changing print font sizes, or converting written text and/or graphic information to aural speech. Accessibility features also relate to modifying how information is input into the user's device (such as a computer), to include changing the time delay for auto-repeat functions on a keyboard for users unable to quickly strike keys, changing mouse roller ball sensitivity and other changes to input devices to accommodate physical limitations of the user. Internet accessibility programs have historically been limited to a particular application program or operating system for the client device being used by the handicapped user. Additionally, some web pages have inherent accessibility functions that can be used only for that page.

Another problem found in accessibility prior art relates to the process of transcoding content format from content provider 18 to a format that is recognizable by the hardware/software of a particular client device 10. Typically, a response from a web page is conventionally formatted via standard page description language such as HTML, which contains text and can reference graphics, sound, animation and video data. If client device 10 is a pervasive device, such as a PDA, smart phone, wearable computer, etc., it typically must communicate in a non-HTML language, and usually through a dedicated ISP 12. The dedicated ISP 12 directs the request from the pervasive device to a special URL, typically sub-defined by content server 16 or content provider 18, to reply with the appropriate response in the appropriate language, such as Wireless Application Protocol (WAP) for handheld wireless devices such as mobile phones, pagers, two-way radios, smart phones and communicators. Alternatively, ISP 12 may have the ability to transcode an HTML response from a content provider 18, but this ability has historically been limited to a limited predefined number of content providers. Thus accessibility requires not only transcoding of content style by changing font size, background color, etc., for a particular handicapped user, the transcoded content needs to be in a content format understandable by the particular type of client device 10 being used.

The problem of transcoding for accessibility is complicated if the user of client device 10 sends a request to a secure server. Secure connections in the prior art between a secure content server 16 and client device 10 establish the requirement that the connection be inaccessible to any third party. For example, a user making a purchase over the Internet would want information regarding credit card numbers and other financial details to be inaccessible to outside hackers. A secure content server 16 supports any of the major security protocols that encrypt and decrypt messages to protect them against third-party tampering. A typical protocol for a secure connection is the Secure Sockets Layer (SSL) protocol, which uses a public key, typically a code table, to decipher any coded data. By convention, web pages that require an SSL connection start with the URL address of "https:" instead of "http:". It is understood that the socket of an SSL is typically a software object, not a physical component of a computer system. Thus, accessibility transcoding of content (and content style and content format) from secure web pages can only be accomplished if the transcoder can communicate between client device 10 and secure content server 16.

It should therefore be apparent that there exists a need for an accessibility application repository of accessibility transformation applications downloadable to a client device 10 for transforming the client system access to content and/or content style into a format accessible by a disabled user on his client device 10, as well as transforming input sent from the client device 10. Such a system should also include the ability to transcode the content format into a format readable by different client devices 10 that the user may use. It would further be desirable to devise a computer program product wherein such a method may be performed on a computer system. In addition, it would be desirable to devise a proxy machine having the ability to provide these transformation applications and optionally transcode responses from content provider 18 to client device 10 according to user-defined preferences for accessibility.

SUMMARY OF THE INVENTION

The present invention in its preferred embodiment relates to a method and system that provide a central repository for client specific accessibility applications to a user from an accessible server. The repository is updated on a periodic basis with new solutions provided by the service provider, which also manages licensing agreements between the user and the owner of the accessibility application. Accessibility programs, such as page magnification, screen readers, background changes, input modification, etc., are downloaded into the client device being used by the user customer by clicking link buttons from a web page generated by the service provider's server. The accessibility programs downloaded are then resident on the client device until they are changed by the user. In a preferred embodiment, the service provider also provides a universal transcoding service to apply the user selected accessibility transformations to any type of client device used by the user. The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
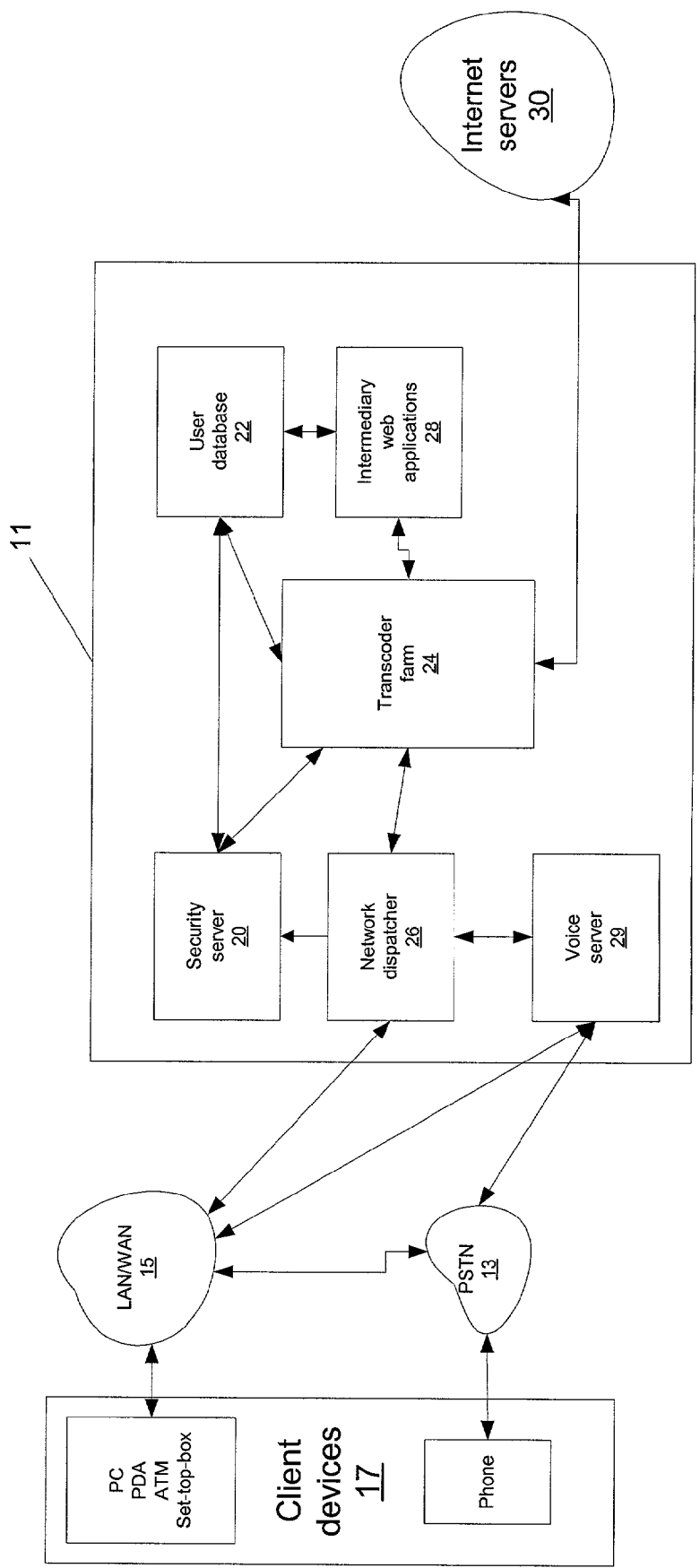
FIG. 2 is a block diagram of an Internet connection using an intermediary server for transcoding.

With reference now to FIG. 2, there is depicted a block diagram of the preferred Internet connection between at least one of client devices 17 and an Internet server 30. Client devices 17 may be any network connected devices connected through a Local Area Network (LAN) or Wide Area Network (WAN), which a LAN/WAN 15 connects directly to a proxy machine 11. Such devices may be a desktop computer, laptop computer, set top box, PDA, Automated Teller Machine (ATM), or computer kiosk. In addition, client device 17 may be a cellular telephone, which typically is connected through a Public Switched Telephone Network PSTN 13 that connects the cellular telephone to proxy machine 11, either directly or via LAN/WAN 15.

Figure 1:
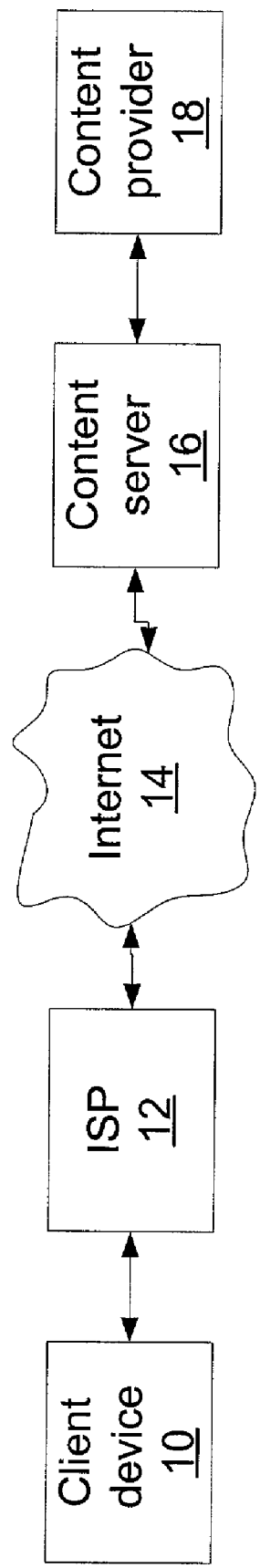
FIG. 1 is a block diagram of prior art Internet connections.

As shown in FIG. 2, in the preferred embodiment proxy machine 11 performs several functions. Proxy machine 11 connects client device 17, as described above, to Internet servers 30, which may be an Internet service (ISP), Internet Content Provider (ICP), or other similar gate way devices. Proxy machine 11 acts as a proxy between client device 17 and Internet server 30, which provides content from content provider 18, shown in FIG. 1. Access to proxy machine 11 may be through a direct or network connection, and may be staged using different communication medium. For example, a telephone may first require transmission through PSTN 13 to a voice server 29. Requests entering proxy machine 11 are routed, for load balancing, through network dispatcher 26. After routing has been determined, the requests are passed to one or more designated transcoders in a transcoder farm 24. User identification information is passed in the request and authenticated by a security server 20 based on the stored user set of protocol. If the user is not known or invalid, proxy machine 11 will direct the client device's user agent (browser) to authenticate the user by prompting it for a user I.D. and password. The authentication information is then be passed to proxy machine 11.

Once a user has been validated, the designated transcoder will caresser data base 22 for profile information. In the preferred embodiment, this profile information is delivered through an extensible markup language (XML) transcoding directive, which provides directives to the transcoder showing the user's preferred transcoding order, format, etc. The designated transcoder will then retrieve the document from Internet server 30, apply the transformation and send it back to client device 17. The transcoding software in proxy machine 11 is designed to handle dynamic transcoding. To do this, each transcoder stores the document retrieved in browser form for manipulation by each of the desired transformations. As a browser, proxy machine 11 works to separate content, data, and executable script for manipulation by the transcoder in transcoder farm 24. This manipulation is designed to improve the accessibility and usability by the disabled or senior user accessing proxy machine 11. The transcoder functions, which are based on the internal browser engine of client device 17, may provide low vision/cognitive transforms, blind transforms, or other transforms.

Other transcoder functions include support for secure connections. Intermediary serve 11 may establish a secure socket connection, preferably in the method and system described in U.S. patent application Ser. No. 09/962,000, and herein incorporated by reference in its entirety, to Internet servers 30, and this secure connection may be accessed from client device 17 through a secure or non-secure connection, depending on user preference and set up of proxy machine 11. In addition, transcoder functions may provide access to intermediary web applications 28, which may be mail, settings, bookmarks, history lists, or other features typically associated with a browser. Therefore, in this application, proxy machine 11 acts a proxy browser providing functions in intermediary web application 28.

User data base 22 functions primarily to provide user profiles specific for a client. User profiles show client content style preferences for accessibility display of content, and these profiles are typically conveyed to the transcoder in transcoder farm 24 through an XML transcode directive. These same user profiles may be passed through intermediary web applications 28, which are then transcoded in transcoder farm 24 according to the user profile.

Referring again now to FIG. 2, as a request is sent from client device 17 to proxy machine 11, the request is sent to Internet server 30 after the client has been authenticated as an authorized user of proxy machine 11. The response is then returned from Internet server 30, typically in HTML format, where it is transcoded in transcoder farm 24 according to a user profile found in user data base 22. The transcoder in transcoder farm 24 then applies the appropriate transform, to include those described above for low vision/cognitive disabilities, blindness, as well as others, including but not limited to screen readers (converting text or graphics into aural speech), operating system specific screen magnifiers, text-to-speech transforms and other operating system accessibility programs.

Proxy machine 11 is able to transcode both for content style transformation as well as device-specific content format transcoding. That is, some transcoders in transcoder farm 24 serve to transform content style into a form that is more accessible to the user, such as increasing font size, changing control buttons, changing background, etc. for easier readability by a low vision user, or even for changing written text into aural speech for the totally blind user, while other transcoders in transcoder farm 24 serve to transform content format into a format understandable by the particular type of client device 17, such as a PDA, cellular phone, laptop computer, etc.

In addition, transcoders in transcoder farm 24 can change input from client device 17 going to proxy machine 11 for passing on to Internet server 30. For example, when the user of client device 17 types back a response to a query from Internet server 30, that user may have a physical disability such as palsy, in which specific typewriter keys are inadvertently repeatedly struck. The user profile in user data base 22, having this information, can direct a transcoder in transcoder farm 24 to automatically correct such double strikes, typically through a combination of timing criteria and logical autocorrection algorithms.

Proxy machine 11 is also able to transcode for device-specific transcoding, such as transcoding content designed in HTML format for a desktop computer into a suitable format, such as WAP, for a PDA. The device-specific transcode can also include the content style transformation. For example, content style may be magnified for any client device 17 used by the user, whether it is a desktop computer or a PDA. By having a user profile stored in proxy machine 11 that is unique for a user, the user is then able to utilize a variety of client devices 17, by all having access to the user's profile in user data base 22. For example, if the user needs to have image magnified, background removed, and a different display color on a desktop computer, the same user preferences would be automatically applied to any computer used by that user when going through proxy machine 11. Thus the user's own laptop, a borrowed desktop, or a public computer terminal would all display content from any Web site in the same format as defined by that user.

Figure 3:
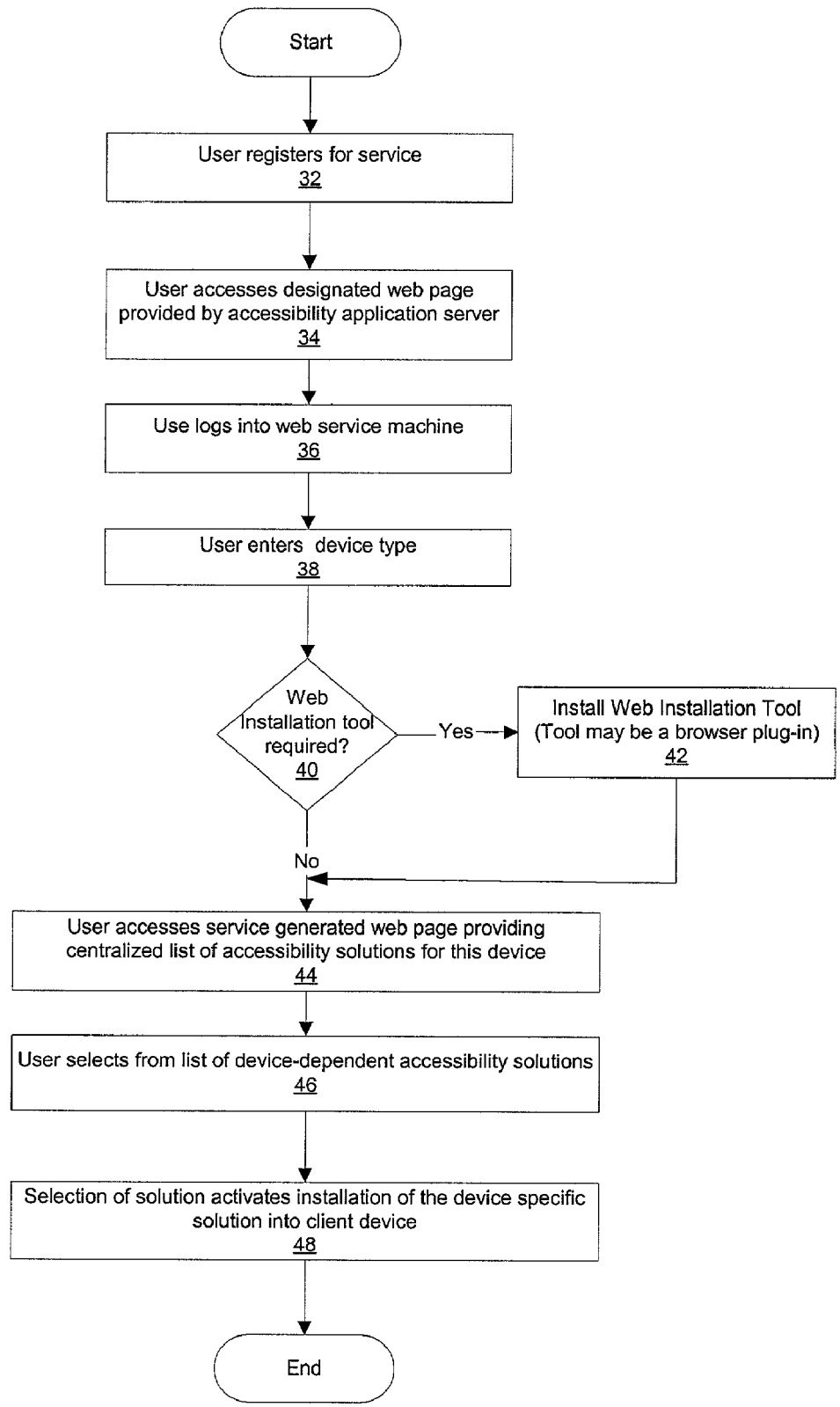
FIG. 3 is a high-level flow chart of a method of providing a central repository for client specific accessibility in accordance with a preferred embodiment of the invention.

Reference is now made to FIG. 3, a high-level flowchart describing a preferred embodiment of the present invention for accessing a central repository of client specific accessibility applications. The repository is preferably updated on a periodic basis with new solutions provided by the service provider, and new solutions may optionally be added by the customer. As depicted in block 32, the user registers for the service, typically by accessing a secure web page provided by the service provider of the central repository of applications. Once registered, the user can then access a designated web page provided by the accessibility application server, as illustrated in block 34. The user then logs into the web service machine and enters the type of client device 17 being used, as depicted in blocks 36 and 38. A query, as illustrated in block 40, is made as to whether client device 17 has already installed a web installation tool for downloading the accessibility applications. If not, such a web installation tool is installed on client device 17, as shown in block 42. In the preferred embodiment, the web installation tool is a browser plug-in. The user then accesses the service generated web page that contains links to various accessibility applications for downloading, as described in block 44. As illustrated in block 46, the user selects which device-dependent accessibility solution is desired, and the solution is downloaded and installed on the client device 17, as described in block 48. The software installer verifies the version of the application requested, locates the source server of the application if it is not resident on proxy machine 11, accesses a package install code, checks for product prerequisites for operating system, etc., accesses the application source files, installs the application and removes any temporary files, if necessary. In the preferred embodiment, the accessibility applications available for downloading are client-specific accessibility applications that enhance the specific client's accessibility of application programs, web-page content, the client's operating system and any other application used by the client.

While not shown in FIG. 3, it is understood that in a preferred embodiment the present invention may also or alternatively transform an input content from client device 17 being sent to proxy machine 11, such transformation including correcting keystroke errors performed by a physically disabled user. In addition, it is understood that in a preferred embodiment proxy machine 11 can transcode content style from any web page for readability on any type of client device 17 used by the user for which transcoders are available in transcoding farm 24, and the transforms applied by the accessibility application(s) selected by the user will be utilized when the content is transcoded into a format used by an alternate type of client device 17.

As shown in the above description, the present invention provides a great improvement in the art of providing accessibility service to clients. By having all accessibility applications in a central repository found in proxy machine 11, the user is able to quickly find and access a wide variety of accessibility applications to make content on a web page accessible. The user does not have to search for the applications since they are all readily available on the same web page of the present invention, and the service provider managing proxy machine 11 can handle licensing issues for applications selected by the user. As described herein, by providing to the user a central repository of client-specific applications, client-specific accessibility problems that cannot be entirely addressed through a traditional transcoding intermediary or networked solution can be solved with the present invention.

It is understood that the present invention also includes a method of doing business that includes providing a service that provides to the client the inventive method and system described herein.

It is understood and appreciated that instructions from a content provider directing that the content provided is not to be transcoded or similarly manipulated should be honored. For example, a "no-transform directive" in an HTTP header or similar instructions should be followed, and the content not transcoded or similarly manipulated according to the instructions of the content provider. A description that is illustrative of such an instruction is found in Section 14.9.5 of the 1999 Network Working Group's HyperText Transfer Protocol HTTP/1.1.

While the invention has been particularly shown and described with reference to a preferred embodiment, it will be understood by those skilled in the art that various changes in form and detail may be made therein without departing from the spirit and scope of the invention.

What is claimed is:

1. A method for providing a central repository of accessibility applications on a computer network, said method comprising:

connecting a proxy machine to a client device;

sending to the client device, from the proxy machine, a centralized list of accessibility applications on a web page, wherein said web page comprises a plurality of links capable of downloading the accessibility applications, and wherein at least one of the accessibility applications is a computer transformer program that is specifically capable of identifying input errors that are caused by a disability of a specific user of the client device, and wherein said input error is identifiable and auto-correctable through a combination of timing criteria and logical auto-correction algorithms that are specific for the disability of the specific user, and wherein the timing criteria identify input errors for a specific user according to a single key being repeatedly struck within a time period described by the timing criteria;

activating at the client device at least one of the plurality of links to download said computer transformer program into the client device; and auto-correcting said input error using said downloaded computer transformer program.

2. The method of claim 1, further comprising entering into the web page a device type of the client device that is downloading said at least one of the accessibility applications.

3. The method of claim 1, wherein the accessibility application is a computer program capable of transforming a content style to be received by the client device.

4. The method of claim 1, further comprising transcoding a content format of a web page being received by the client device into a format understandable by the client device.

5. The method of claim 1, wherein said at least one of the accessibility applications is a client-specific accessibility application for enhancing accessibility of the client operating system.

6. A system for providing a central repository of accessibility applications on a computer network, said system comprising:

means for connecting a proxy machine to a client device;

means for sending to the client device, from the proxy machine, a centralized list of accessibility applications on a web page, wherein said web page comprises a plurality of links capable of downloading the accessibility applications, and wherein at least one of the accessibility applications is a computer transformer program that is specifically capable of correcting input errors that are caused by a disability of a specific user of the client device, and wherein said input error is correctable through a combination of timing criteria and logical auto-correction algorithms that are specific for the disability of the specific user, and wherein the timing criteria identify input errors for a specific user according to a single key being repeatedly struck within a time period described by the timing criteria;

means for activating at the client device at least one of the plurality of links to download said computer transformer program into the client device; and means for correcting said input error using said downloaded computer transformer program.

7. The system of claim 6, further comprising means for entering into the web page a device type of the client device that is downloading said at least one of the accessibility applications.

8. The system of claim 6, wherein the accessibility application is a computer program capable of transforming a content style to be received by the client device.

9. The system of claim 6, further comprising means for transcoding a content format being received by the client device into a format understandable by the client device.

10. The system of claim 6, wherein said at least one of the accessibility applications is a client-specific accessibility application for enhancing accessibility of the client operating system.

11. A computer-readable recording medium having a stored computer program product for providing a central repository of accessibility applications on a computer network, said computer program product comprising:

computer program code for connecting a proxy machine to a client device;

computer program code for sending to the client device, from the proxy machine, a centralized list of accessibility applications on a web page, wherein said web page comprises a plurality of links capable of downloading the accessibility applications, and wherein at least one of the accessibility applications is a computer transformer program that is specifically capable of correcting input errors that are caused by a disability of a specific user of the client device, and wherein said input error is correctable through a combination of timing criteria and logical auto-correction algorithms that are specific for the disability of the specific user, and wherein the timing criteria identify input errors for a specific user according to a single key being repeatedly struck within a time period described by the timing criteria;

computer program code for activating at the client device at least one of the plurality of links to download said computer transformer program into the client device; and computer program code for correcting said input error using said downloaded computer transformer program.

12. The computer-readable recording medium of claim 11, further comprising program code for entering into a web page a device type of the client device that is downloading at least one of the accessibility applications.

13. The computer-readable recording medium of claim 11 wherein the accessibility application is a computer program capable of transforming a content style to be received by the client device.

14. The computer-readable recording medium of claim 11, further comprising computer program code capable of transcoding a content format being received by the client device into a format understandable by the client device.

15. The computer-readable recording medium of claim 11, further comprising computer program code for said at least one of the accessibility applications being a client-specific accessibility application for enhancing accessibility of the client operating system.

* * * * *